US011132448B2

(12) United States Patent
Bikumala et al.

(10) Patent No.: US 11,132,448 B2
(45) Date of Patent: Sep. 28, 2021

(54) ENCRYPTION USING WAVELET TRANSFORMATION

(71) Applicant: Dell Products L.P., Round Rock, TX (US)

(72) Inventors: Sathish Bikumala, Round Rock, TX (US); Siddharth Agrawal, Sambalpur (IN); Ashish Kumar Palo, Koraput (IN)

(73) Assignee: Dell Products L.P., Round Rock, TX (US)

( * ) Notice: Subject to any disclaimer, the term of this patent is extended or adjusted under 35 U.S.C. 154(b) by 289 days.

(21) Appl. No.: 16/051,964

(22) Filed: Aug. 1, 2018

(65) Prior Publication Data

US 2020/0042722 A1  Feb. 6, 2020

(51) Int. Cl.
*G06F 21/00* (2013.01)
*H04L 29/06* (2006.01)
*G06F 21/60* (2013.01)
*H04L 9/32* (2006.01)

(52) U.S. Cl.
CPC .......... *G06F 21/602* (2013.01); *H04L 9/321* (2013.01); *H04L 9/3226* (2013.01); *H04L 9/3239* (2013.01)

(58) Field of Classification Search
CPC ..... G06F 21/602; H04L 9/321; H04L 9/3226; H04L 9/3239
See application file for complete search history.

(56) References Cited

U.S. PATENT DOCUMENTS

| | | | |
|---|---|---|---|
| 6,505,299 B1 | 1/2003 | Zeng et al. | |
| 7,349,542 B2 | 3/2008 | Fekri | |
| 7,457,419 B2 | 11/2008 | Hayashi | |
| 2004/0262395 A1* | 12/2004 | Longacre, Jr. | G06K 7/10544 235/462.15 |
| 2009/0046943 A1* | 2/2009 | Ishiga | G06T 7/13 382/266 |
| 2015/0302211 A1* | 10/2015 | Kim | G06F 21/604 726/27 |
| 2016/0294820 A1* | 10/2016 | Douglas-Middleton | G06F 21/00 |
| 2018/0288012 A1* | 10/2018 | Khylenko | G06F 21/606 |
| 2018/0315433 A1* | 11/2018 | Goodwin | G10L 19/26 |
| 2019/0363877 A1* | 11/2019 | Figueira | H04L 9/0869 |

* cited by examiner

*Primary Examiner* — Jeffrey C Pwu
*Assistant Examiner* — Rodman Alexander Mahmoudi
(74) *Attorney, Agent, or Firm* — Ryan, Mason & Lewis, LLP

(57) ABSTRACT

Methods, apparatus, and processor-readable storage media for encryption using wavelet transformation are provided herein. An example computer-implemented method includes generating a modified item of cryptographic information by randomly incorporating one or more characters into a user-provided item of cryptographic information; converting the modified item of cryptographic information to a matrix code; creating multiple bands of data by applying wavelet transformation to the matrix code; generating one or more encrypted items of cryptographic information by converting a selected one of the multiple bands of data into a sequence of multiple characters by applying an encoding process to the selected band of data; and storing the encrypted items of cryptographic information in a database for use in authentication requests.

20 Claims, 5 Drawing Sheets

ENCRYPTION USING WAVELET TRANSFORMATION

FIELD

The field relates generally to information processing systems, and more particularly to techniques for providing security in such systems.

BACKGROUND

In order to gain access to applications or other resources via a computer or another user device, users are often required to authenticate themselves by entering authentication information. Such authentication information may include, for example, passwords, responses to one or more challenge questions, or other forms of cryptographic or authentication information. However, data security is an increasingly challenging issue for businesses and organizations.

As noted, conventional security approaches include requiring a user to authenticate herself via use of credentials such as a username and a password. Such an approach then includes matching the user-supplied credentials with data stored in a database, and granting access to a particular resource if the user-supplied credentials match the stored data. However, if the database in which the user credentials are stored becomes compromised, then potential security issues arise.

Other conventional security approaches include using cryptographic hash functions, which typically transform a credential into a string of alpha-numeric characters. However, such approaches present security challenges as well, because an adverse entity can generate large numbers of hashes by brute-forcing various possible combinations, and can then compare such hashes with hashes stored in database to extract user credentials.

SUMMARY

Illustrative embodiments of the invention provide techniques for encryption using wavelet transformation. An exemplary computer-implemented method can include generating a modified item of cryptographic information by randomly incorporating one or more characters into a user-provided item of cryptographic information, and converting the modified item of cryptographic information to at least one matrix code. Additionally, such a method can include creating multiple bands of data by applying at least one wavelet transformation to the at least one matrix code, and generating one or more encrypted items of cryptographic information by converting a selected one of the multiple bands of data into a sequence of multiple characters by applying one or more encoding processes to the selected band of data. Further, such a method can also include storing the one or more encrypted items of cryptographic information in a database for use in processing one or more authentication requests.

Illustrative embodiments can provide significant advantages relative to conventional data security approaches. For example, challenges associated with brute-force attacks on conventional approaches are overcome through the use of wavelet transformation. Additionally, challenges associated with reverse engineering of conventional approaches are overcome due to the inability of an attacker to reconstruct a quick-response code using a single band of data.

These and other illustrative embodiments described herein include, without limitation, methods, apparatus, systems, and computer program products comprising processor-readable storage media.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
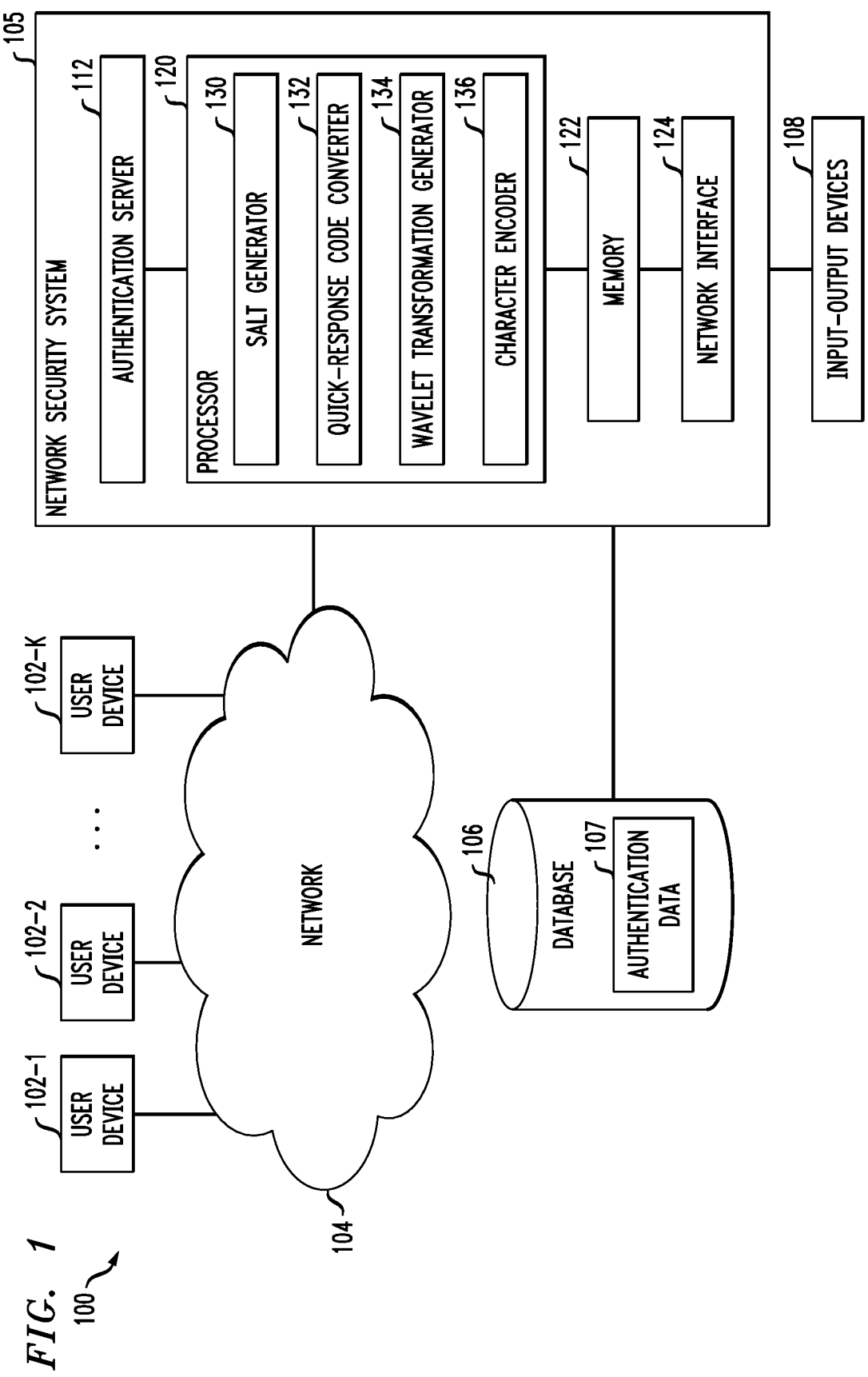
FIG. 1 shows an information processing system configured for encryption using wavelet transformation in an illustrative embodiment of the invention.

FIG. 1 shows a computer network (also referred to herein as an information processing system) 100 configured in accordance with an illustrative embodiment of the invention. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a network security system 105. The user devices 102 may comprise, for example, mobile telephones, laptop computers, tablet computers, desktop computers or other types of devices capable of supporting user logins, in any combination. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The network security system 105 has an associated database 106 configured to store authentication data 107 illustratively comprising information related to authentication processes, such as, for example, cryptographic information including passwords, encrypted passwords, quick-response codes, salt characters, etc.

The database 106 in the present embodiment is implemented using one or more storage systems associated with the network security system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the network security system 105 are input-output devices 108, which illustratively comprise keyboards, displays or other types of input-output devices in any combination. Such input-output devices are used to support one or more user interfaces to the network security system 105, as well as to support communication between the network security system 105 and other related systems and devices not explicitly shown.

The network security system 105 comprises an authentication server 112. By way of example, authentication requests (such as login events) initiated at respective ones of the user devices 102 are directed to the authentication server 112 over the network 104 for processing. The authentication server 112 determines if a given access attempt is authentic based on presentation of one or more predetermined authentication factors such as user identifiers, passwords or other factors. Upon verification of the presented authentication factors, the authentication server 112 grants the requesting user device 102 access to one or more protected resources of the computer network 100. Although shown as an element of the network security system 105 in this embodiment, the authentication server 112 in other embodiments can be implemented at least in part externally to the network security system 105, for example, as a stand-alone server, set of servers or other type of authentication system coupled to the network 104.

The network security system 105 in the FIG. 1 embodiment is assumed to be implemented using at least one processing device. Each such processing device generally comprises at least one processor and an associated memory, and implements one or more functional modules for controlling certain features of the network security system 105.

More particularly, the network security system 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments of the invention include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the network security system 105 to communicate over the network 104 with the user devices 102, and illustratively comprises one or more conventional transceivers.

The processor 120 further comprises a salt generator 130, a quick-response code converter 132, a wavelet transformation generator 134 and a character encoder 136.

It is to be appreciated that this particular arrangement of modules 130, 132, 134 and 136 illustrated in the processor 120 of the FIG. 1 embodiment is presented by way of example only, and alternative arrangements can be used in other embodiments. For example, the functionality associated with the modules 130, 132, 134 and 136 in other embodiments can be combined into a single module, or separated across a larger number of modules. As another example, multiple distinct processors can be used to implement different ones of the modules 130, 132, 134 and 136 or portions thereof.

At least portions of the salt generator 130, quick-response code converter 132, wavelet transformation generator 134 and character encoder 136 may be implemented at least in part in the form of software that is stored in memory 122 and executed by processor 120. Similarly, at least portions of the authentication server 112 of the network security system 105 can be implemented at least in part in the form of software that is stored in memory 122 and executed by processor 120.

It is to be understood that the particular set of elements shown in FIG. 1 for encryption using wavelet transformation involving user devices 102 of computer network 100 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the network security system 105 can be eliminated and associated elements such as authentication server 112, salt generator 130, quick-response code converter 132, wavelet transformation generator 134 and character encoder 136 can be implemented elsewhere in the computer network 100.

An exemplary process utilizing salt generator 130, quick-response code converter 132, wavelet transformation generator 134 and character encoder 136 of the network security system 105 in computer network 100 will be described in more detail with reference to the flow diagram of FIG. 4.

Figure 2:
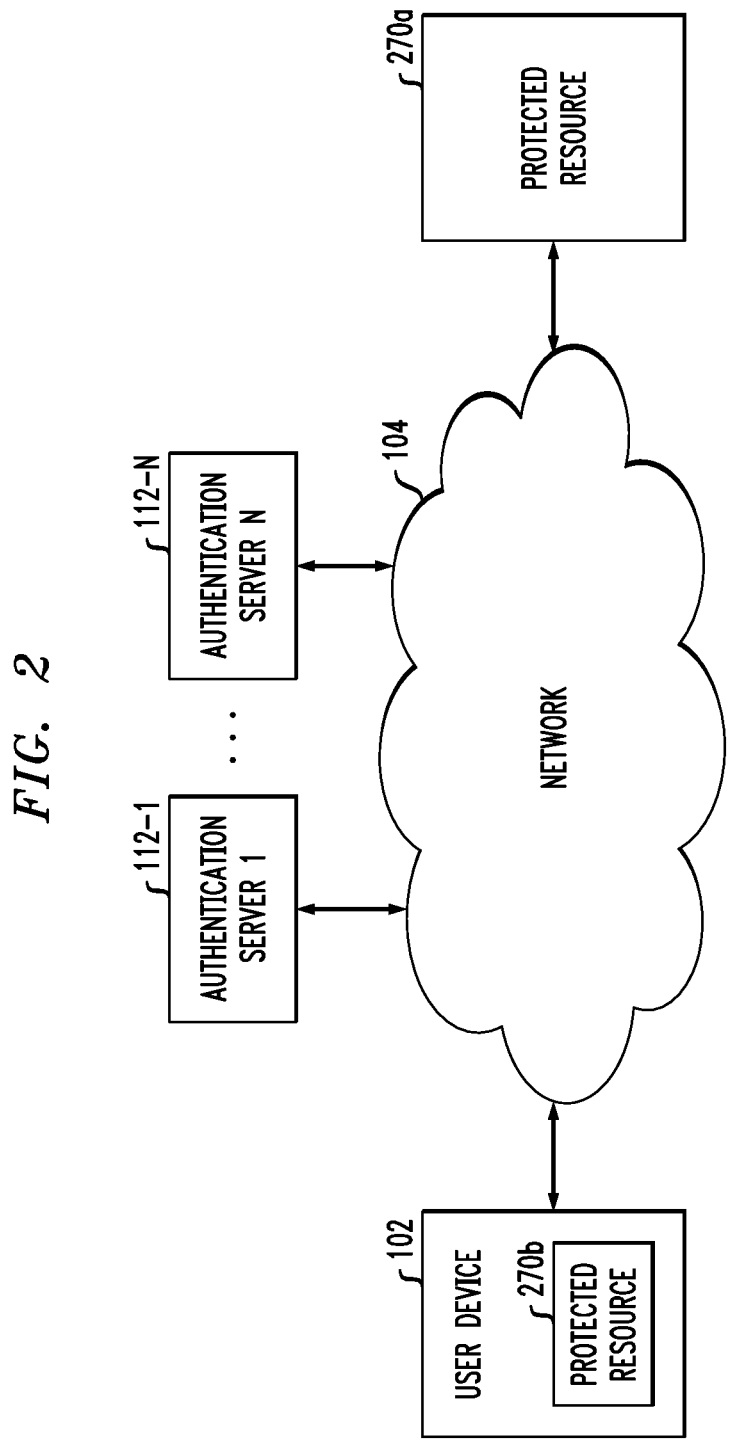
FIG. 2 shows another information processing system configured for encryption using wavelet transformation in an illustrative embodiment of the invention.

FIG. 2 is a system diagram of an illustrative embodiment of the invention. By way of illustration, FIG. 2 depicts an alternative embodiment to FIG. 1, wherein the authentication server(s) 112 is/are not resident on the user device(s) 102, but rather are separate devices. Accordingly, as depicted in FIG. 2, user device 102 communicates with a protected resource 270a over network 104. As detailed further below, at least one embodiment of the invention can also include a user device 102 that includes a protected resource 270b residing thereon. In an example implementation, a user authenticates online with one or more authentication servers 112-1 through 112-N (hereinafter, collectively referred to as authentication servers 112) before obtaining access to protected resource 270a and/or 270b (hereinafter, collectively referred to as protected resource 270 unless otherwise specified).

According to one aspect of the invention, as noted above, the user of the user device 102 is authenticated by authentication servers 112 using a password, challenge questions, and/or other forms of cryptographic information. The exemplary communications among the system elements 102, 104 and 270 of FIG. 2 used to achieve authentication by the authentication servers 112 are discussed further below.

It is to be appreciated that a given embodiment of the disclosed system may include multiple instances of user device 102 and protected resource 270, and possibly other system components, although only single instances of such components are shown in the simplified system diagram of FIG. 2 for clarity of illustration.

As noted herein, user device 102 may represent a portable device, such as a mobile telephone, personal digital assistant (PDA), wireless email device, game console, etc. The user device 102 may alternatively represent a desktop or laptop personal computer (PC), a microcomputer, a workstation, a mainframe computer, a wired telephone, a television set top box, or any other information processing device which can benefit from the use of authentication techniques in accordance with the invention.

The user device 102 may also be referred to herein as simply a "user." The term "user," as used in this context, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password, challenge question, or other cryptographic information described as being associated with a user may, for example, be associated with a user device 102, a person utilizing or otherwise associated with the device, or a combination of both the person and the device.

As also depicted in FIG. 2, the authentication servers 112 can be associated with a third party entity, such as an authentication authority, that processes authentication requests on behalf of web servers and other resources, as well as verifies the cryptographic information that is presented by a user device 102.

Further, the protected resource 270 may be, for example, an access-controlled application, web site or hardware device. In other words, a protected resource 270 is a resource that grants user access responsive to an authentication process, as will be described in greater detail below. For example, protected resource 270a may include an access controlled file, e-mail, a protected application, a remote application server such as a web site or other software program or hardware device that is accessed by the user device 102 over a network 104.

Additionally, in at least one embodiment of the invention, protected resource 270b can include one or more applications or data residing on the user device 102 itself. For example, such a protected resource 270b can include access to a mobile data management container for launching applications on the user device 102 (such as a mobile device), which can be protected requiring authentication in order to run the application(s) protected by the container. Further, protected resource 270b could also include an access controlled file, e-mail, a protected application, a remote application server such as a web site or other software program or hardware device that is accessed by the user device 102 over network 104. Similarly, it is possible that in order to unlock the mobile platform to perform operations, a successful authentication might be required.

As used herein, salting, for example, a password, refers to adding a random string of characters (a "salt") to the password. At least one embodiment of the invention includes using a different salt for each password.

Figure 3:
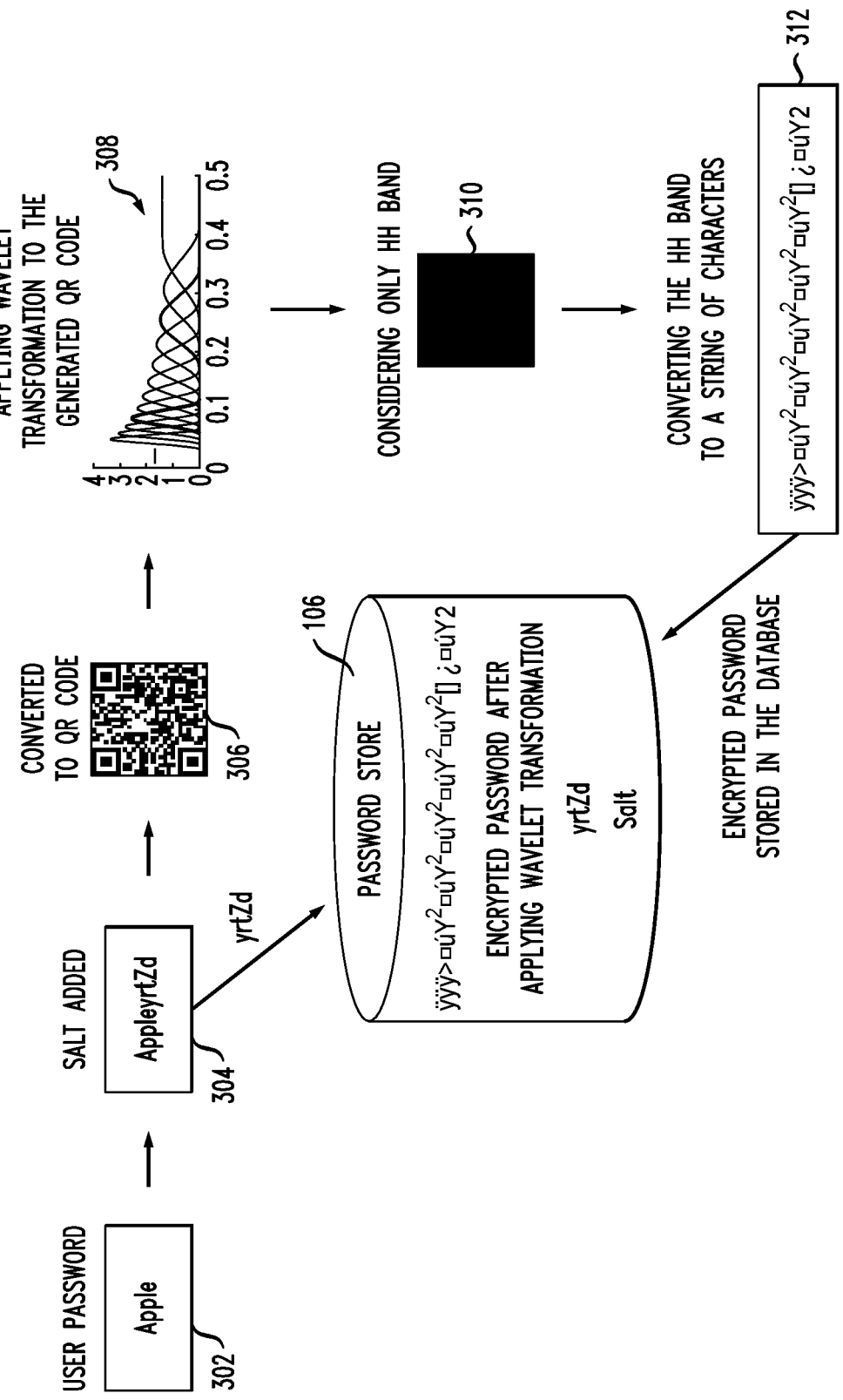
FIG. 3 shows system architecture for encryption using wavelet transformation in an illustrative embodiment of the invention.

FIG. 3 shows system architecture for encryption using wavelet transformation in an illustrative embodiment of the invention. By way of illustration, FIG. 3 depicts a password ("Apple") entered by a user in step 302, and salt ("yrtZd") being added to the password in step 304. In step 306, the resulting string of characters ("AppleyrtZd") is converted to a quick-response (QR) code. In step 308, a wavelet transformation is applied to the generated QR code, resulting in the formation of four different frequency bands: a low-low (LL) band, a low-high (LH) band, a high-low (HL) band, and a high-high (HH) band, with the HH band containing the least amount of information.

In step 310, only the HE band is considered and/or utilized, and step 312 includes converting the HH band back to a string of characters using one or more encoding processes. This string of characters can then be stored in the database 106, along with the salt added to the password in step 304. Further, in one or more embodiments of the invention, after applying the wavelet transformation in step 308, only the HE band is considered in step 310 (as noted above) and the other three bands (LH, HL and LL) are discarded.

Additionally, in one or more embodiments of the invention, steps 304, 306, 308, 310 and 312 are carried out on the back-end, for example, via one or more servers.

As detailed herein, at least one embodiment of the invention includes providing additional security over existing hashing algorithms via implementation of image processing and wavelet transformation. By way merely of illustration and not limitation, consider the following use case implementation of an example embodiment of the invention. A user creates a new account, for example, in an electronic-commerce (e-commerce) application, a financial or non-financial company website. The user provides necessary details, including cryptographic information such as a password, a card or account number, etc. Before storing any cryptographic information (for example, a provided password) in a database, the cryptographic information is encrypted. One or more methods for encryption can be implemented by embodiments of the invention, such as basic password encryption, hashed passwords using hash functions such as message-digest hash functions and the secure hash algorithm (SHA).

Additionally, the encrypted cryptographic information (password), before being stored in the database, is converted to a quick-response (QR) code. A QR code can use four standardized encoding modes (numeric, alphanumeric, byte/binary, and kanji) to efficiently store data. As detailed herein, once the cryptographic information is converted to a QR code, wavelet transformation is applied on the QR code, resulting in the formation of multiple frequency bands (for example, LL, LH, HL, and HH bands).

The techniques detailed herein, as noted, provide security enhancements and render security breaches significantly challenging to carry out successfully. Every unique QR code generates a unique HH band, and QR code hashing can be implemented to add complexity and increase the time it would take (an attacker) to attempt different passwords. Also, wavelet transformations (transforms) involve linear algebra. By way of example, graphics processing unit (GPU) cards are designed for graphic display, demanding high single-precision performance. However, other types of calculations, such as linear algebra problems, typically require double-precision processing. Accordingly, because wavelet transforms involves linear algebra, one or more embodiments of the invention include significantly slowing down and/or limiting brute-force security attacks. Additionally, in connection with at least one embodiment of the invention, reverse engineering is extremely challenging because an attacker cannot reconstruct the QR code using only a single band (such as, for the example, the utilized HH band), and such embodiments also include discarding the bands not encoded and stored in a database.

Wavelet transforms include a mathematical means for performing signal analysis when signal frequency varies over time. For certain classes of signals and images, wavelet analysis can provide more precise information about signal data than other signal analysis techniques. An image can be represented as a two-dimensional array of coefficients, each coefficient representing the brightness level in that point. When looking from a higher perspective, it can be challenging to differentiate between coefficients as more important coefficients versus lesser important coefficients. However, more intuitive considerations can potentially assist in this task. For example, most natural images have smooth color variations, with the fine details being represented as sharp edges in between the smooth variations. Technically, the smooth variations in color can be termed as low-frequency variations and the sharp variations can be termed as high-frequency variations. The low-frequency components (the smooth variations, for example) can constitute the base of an image, and the high-frequency components (the edges which provide detail, for example) add upon the low-frequency components to refine the image, thereby providing a detailed image.

In at least one embodiment of the invention, a wavelet transformation application can be carried out as follows. A low-pass filter and a high-pass filter are chosen, such that they halve the frequency range between them. This filter pair is referred to herein as the analysis filter pair. Accordingly, the low-pass filter is applied to the QR code for each row of data, thereby capturing the low-frequency components of each row. However, because the low-pass filter is a half-band filter, the output data contains frequencies only in the first half of the original frequency range. As such, using one or more sampling techniques (such as, for example, the Nyquist-Shannon sampling theorem), the output data can be sub-sampled by two, so that the output data thereby contains only half of the original number of samples.

At this point, the high-pass filter can be applied for the same row of data, and similarly, the high-pass components are separated and placed approximate to the low-pass components. This procedure can then be carried out for all rows of data. Next, the filtering is carried out for each column of the intermediate data. In one or more embodiments of the invention, the resulting two-dimensional array of coefficients contains four bands of data (LL, HL, LH and HH). In such an embodiment, the LL band contains the most amount of information (relative to the four bands) whereas the HH band contains the least amount of information (relative to the four bands).

Figure 4:
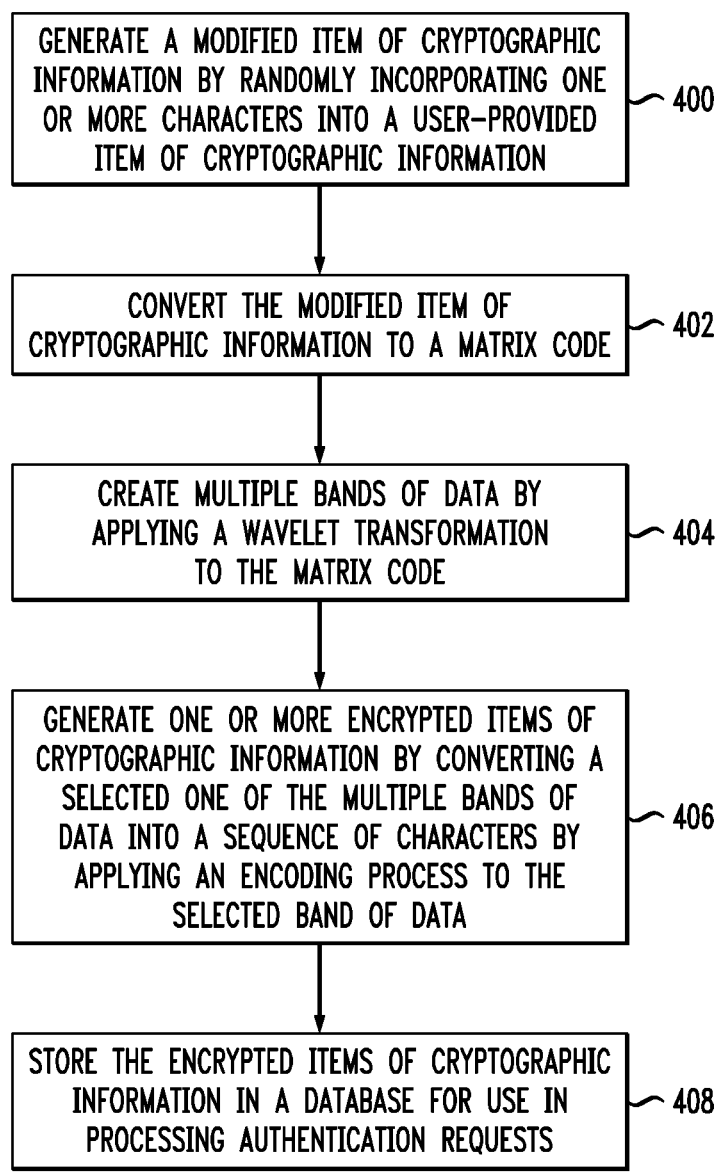
FIG. 4 is a flow diagram of a process for encryption using wavelet transformation in an illustrative embodiment.

FIG. 4 is a flow diagram of a process for encryption using wavelet transformation in an illustrative embodiment. It is to be understood that this particular process is only an example, and additional or alternative processes can be carried out in other embodiments.

In this embodiment, the process includes steps 400 through 408. These steps are assumed to be performed by the processor 120 utilizing its modules 130, 132, 134 and 136.

Step 400 includes generating a modified item of cryptographic information by randomly incorporating one or more characters into a user-provided item of cryptographic information. The user-provided item of cryptographic information can include a password, and the one or more characters can include one or more alpha-numeric characters. Additionally, at least one embodiment of the invention can also include executing one or more hashing algorithms on the modified item of cryptographic information.

Step 402 includes converting the modified item of cryptographic information to at least one matrix code. The matrix code can include, for example, at least one quick-response code. Step 404 includes creating multiple bands of data by applying at least one wavelet transformation to the at least one matrix code. The multiple bands of data can include a low-low band of data, a low-high band of data, a high-low band of data, and a high-high band of data. Also, the at least one wavelet transformation can include multiple iterations of filtering the multiple bands of data.

Step 406 includes generating one or more encrypted items of cryptographic information by converting a selected one of the multiple bands of data into a sequence of multiple characters by applying one or more encoding processes to the selected band of data. The sequence of multiple characters can include a sequence of alpha-numeric characters. In at least one embodiment of the invention, the selected band of data can include a high-high band of data. Additionally, in at least one embodiment of the invention, the selected band of data can include the least amount of information among the multiple bands of data. Further, one or more embodiments of the invention include discarding each of the multiple bands of data except for the selected band of data.

Step 408 includes storing the one or more encrypted items of cryptographic information in a database for use in processing one or more authentication requests.

Accordingly, the particular processing operations and other network functionality described in conjunction with the flow diagram of FIG. 4 are presented by way of illustrative example only, and should not be construed as limiting the scope of the invention in any way. Alternative embodiments can use other types of processing operations to detect session-based access anomalies and undertake appropriate remediation actions. For example, the ordering of the process steps may be varied in other embodiments, or certain steps may be performed concurrently with one another rather than serially. Also, as indicated previously, the process steps or subsets thereof may be repeated periodically in conjunction with respective distinct instances of session-based anomaly detection for different user identifiers.

The above-described illustrative embodiments provide significant advantages relative to conventional approaches.

For example, some embodiments are configured to provide additional layers of security on top of existing encryption techniques. These and other embodiments can effectively limit and diminish, through the use of wavelet transforms, the inability of an attacker to successfully obtain cryptographic information. For instance, such embodiments preclude a potential attacker from reconstructing a quick-response code using only a single band of data.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Services (AWS), Google Cloud Platform (GCP) and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
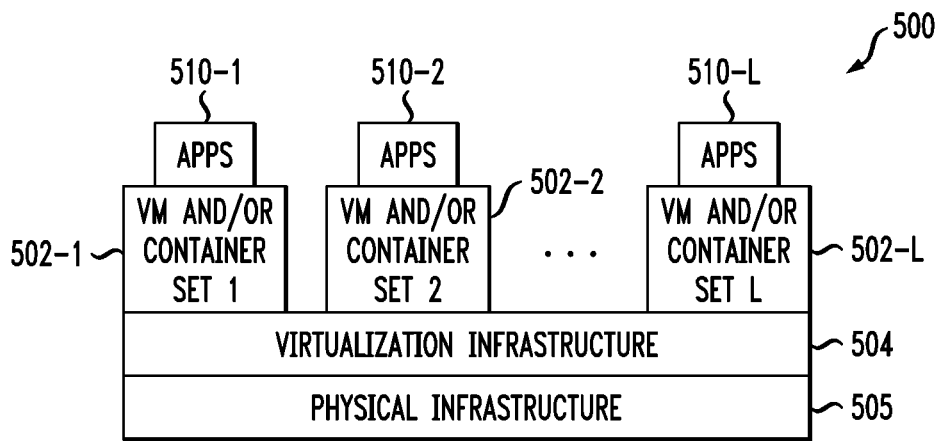
FIGS. 5 and 6 show examples of processing platforms that may be utilized to implement at least a portion of an information processing system in illustrative embodiments.
Figure 6:
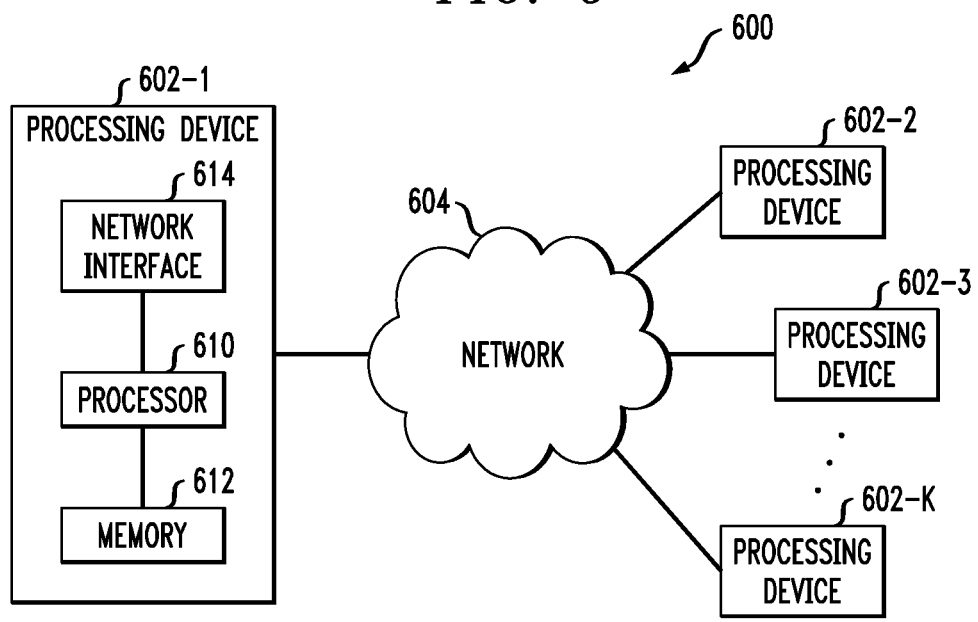

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide deduplication estimate generation functionality of the type described above for one or more processes running on a given one of the VMs. For example, each of the VMs can implement deduplication control logic and associated deduplication estimate tables for providing deduplication estimate generation functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide deduplication estimate generation functionality of the type described above for one or more processes running on different ones of the containers. For example, a container host device supporting multiple containers of one or more container sets can implement one or more instances of deduplication control logic and associated deduplication estimate tables for use in generating deduplication estimates.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to provide security capabilities. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A computer-implemented method comprising:
generating a modified item of cryptographic information by randomly incorporating one or more characters into a user-provided item of cryptographic information;
converting the modified item of cryptographic information to at least one matrix code using multiple encoding modes to store at least a portion of the modified item of cryptographic information;
creating multiple bands of data by applying at least one wavelet transformation to the at least one matrix code, wherein the multiple bands of data comprise a low-low band of data, a low-high band of data, a high-low band of data, and a high-high band of data;
selecting the high-high band of data and discarding the low-low band of data, the low-high band of data, and the high-low band of data;
generating one or more encrypted items of cryptographic information by converting the high-high band of data into a sequence of multiple characters by applying one or more encoding processes to the high-high band of data; and
storing the one or more encrypted items of cryptographic information in a database for use in processing one or more authentication requests;
wherein the method is performed by at least one processing device comprising a processor coupled to a memory.

2. The computer-implemented method of claim 1, further comprising:
executing one or more hashing algorithms on the modified item of cryptographic information.

3. The computer-implemented method of claim 1, wherein the at least one matrix code comprises at least one quick-response code.

4. The computer-implemented method of claim 1, wherein the at least one wavelet transformation comprises multiple iterations of filtering the multiple bands of data.

5. The computer-implemented method of claim 1, wherein the user-provided item of cryptographic information comprises a password.

6. The computer-implemented method of claim 1, wherein the one or more characters comprise one or more alpha-numeric characters.

7. The computer-implemented method of claim 1, wherein the sequence of multiple characters comprises a sequence of alpha-numeric characters.

8. A non-transitory processor-readable storage medium having stored therein program code of one or more software programs, wherein the program code when executed by at least one processing device causes the at least one processing device:
to generate a modified item of cryptographic information by randomly incorporating one or more characters into a user-provided item of cryptographic information;
to convert the modified item of cryptographic information to at least one matrix code using multiple encoding modes to store at least a portion of the modified item of cryptographic information;
to create multiple bands of data by applying at least one wavelet transformation to the at least one matrix code, wherein the multiple bands of data comprise a low-low band of data, a low-high band of data, a high-low band of data, and a high-high band of data;
to select the high-high band of data and discard the low-low band of data, the low-high band of data, and the high-low band of data;
to generate one or more encrypted items of cryptographic information by converting the high-high band of data into a sequence of multiple characters by applying one or more encoding processes to the high-high band of data; and
to store the one or more encrypted items of cryptographic information in a database for use in processing one or more authentication requests.

9. The non-transitory processor-readable storage medium of claim 8, wherein the program code when executed by at least one processing device further causes the at least one processing device:
to execute one or more hashing algorithms on the modified item of cryptographic information.

10. The non-transitory processor-readable storage medium of claim 8, wherein the at least one matrix code comprises at least one quick-response code.

11. An apparatus comprising:
at least one processing device comprising a processor coupled to a memory;
the at least one processing device being configured:
to generate a modified item of cryptographic information by randomly incorporating one or more characters into a user-provided item of cryptographic information;
to convert the modified item of cryptographic information to at least one matrix code using multiple encoding modes to store at least a portion of the modified item of cryptographic information;
to create multiple bands of data by applying at least one wavelet transformation to the at least one matrix code, wherein the multiple bands of data comprise a low-low band of data, a low-high band of data, a high-low band of data, and a high-high band of data;
to select the high-high band of data and discard the low-low band of data, the low-high band of data, and the high-low band of data;
to generate one or more encrypted items of cryptographic information by converting the high-high band of data into a sequence of multiple characters by applying one or more encoding processes to the high-high band of data; and
to store the one or more encrypted items of cryptographic information in a database for use in processing one or more authentication requests.

12. The apparatus of claim 11, wherein the at least one processing device is further configured:
to execute one or more hashing algorithms on the modified item of cryptographic information.

13. The apparatus of claim 11, wherein the at least one matrix code comprises at least one quick-response code.

14. The apparatus of claim 11, wherein the at least one wavelet transformation comprises multiple iterations of filtering the multiple bands of data.

15. The apparatus of claim 11, wherein the user-provided item of cryptographic information comprises a password.

16. The apparatus of claim 11, wherein the one or more characters comprise one or more alpha-numeric characters.

17. The apparatus of claim 11, wherein the sequence of multiple characters comprises a sequence of alpha-numeric characters.

18. The non-transitory processor-readable storage medium of claim 8, wherein the at least one wavelet transformation comprises multiple iterations of filtering the multiple bands of data.

19. The non-transitory processor-readable storage medium of claim 8, wherein the user-provided item of cryptographic information comprises a password.

20. The non-transitory processor-readable storage medium of claim 8, wherein the one or more characters comprise one or more alpha-numeric characters.

* * * * *